United States Patent [19]
Wurm et al.

[11] Patent Number: 4,472,057
[45] Date of Patent: * Sep. 18, 1984

[54] AREA METER

[75] Inventors: John H. Wurm; Lyle R. Middendorf; William W. Biggs, all of Lincoln, Nebr.

[73] Assignee: Li-Cor, Inc., Lincoln, Nebr.

[*] Notice: The portion of the term of this patent subsequent to Mar. 8, 2000 has been disclaimed.

[21] Appl. No.: 318,955

[22] Filed: Nov. 6, 1981

Related U.S. Application Data

[62] Division of Ser. No. 929,277, Jul. 31, 1978, Pat. No. 4,375,920.

[51] Int. Cl.³ .................. G01B 11/28; G01B 11/04
[52] U.S. Cl. ............................ 356/380; 250/560; 356/372
[58] Field of Search ................. 356/379-380, 356/383-384, 372, 397, 385-387, 398; 358/107; 250/560, 223 R, 223 B, 578; 350/115

[56] References Cited

U.S. PATENT DOCUMENTS

| | | | |
|---|---|---|---|
| 2,360,883 | 10/1944 | Metcalf | 250/223 R |
| 3,207,909 | 9/1965 | Lakso et al. | 250/223 R |
| 3,484,615 | 12/1969 | Noro et al. | 356/386 |
| 3,782,833 | 1/1974 | Biggs et al. | 356/380 |
| 3,804,528 | 4/1974 | Kilmer et al. | 356/397 |
| 4,061,914 | 12/1977 | Green | 250/578 |
| 4,063,820 | 12/1977 | Borgese | 356/386 |
| 4,375,920 | 3/1983 | Wurm et al. | 356/380 |

FOREIGN PATENT DOCUMENTS 101352  8/1979  Japan .................... 356/372

OTHER PUBLICATIONS

Rycroft, R. J., "A Non-Contacting Width Monitor & a Position Sensitive Photocell", Colloquium on Optical Techniques for Measurement in Control, London England, Oct. 26, 1970, pp. 5/1-5/4.

Primary Examiner—William H. Punter
Attorney, Agent, or Firm—Vincent L. Carney

[57] ABSTRACT

The resolution of the measuring system of a conveyor type leaf-area meter is optimized when changes are made in the size of the area that is scanned by adjusting: (1) the lens of the scanner; (2) the rate of readout of the pulses from the scanner; and (3) the decimal place of the display unit.

14 Claims, 7 Drawing Figures

AREA METER

REFERENCE TO RELATED APPLICATIONS

This application is a divisional application of U.S. application No. 929,277 now U.S. Pat. No. 4,375,920 for AREA METER filed by William W. Biggs, Lyle Pichard Middendorf and John Henry Wurm on July 31, 1978, and assigned to the same assignee as this application.

BACKGROUND OF THE INVENTION

This invention relates to area meters.

In the one class of area measuring device, the object to be measured and a sensor are moved with respect to each other, with the sensor generating pulses proportional to the area of the object that is being measured. A counter counts the pulses and indicates the area. Certain types of this class of area measuring device include a conveyor transport system that moves the object past the scanner.

In a prior art type of area measuring device of this class, the object to be measured is scanned by a light beam which sweeps across the object and the light not bocked by the object is collected by a photocell. During the time of each scan that light is blocked by the object, pulses are counted. The pulses are generated in a photocell by light which passes through apertures in a disc, driven by gears in synchronism with the conveyor belt. The pulses are counted to indicate the area.

The prior art apparatuses have the disadvantage of being designed to measure objects of substantially the same width and thus losing resolution for smaller objects and tending to be inaccurate in measuring edges.

SUMMARY OF THE INVENTION

Accordingly, it is an object of the invention to provide a novel area measuring device.

It is a still further object of the invention to provide an improved area measuring system.

It is a still further object of the invention to provide an area measuring system which may be easily adjusted to measure different amounts of area with good resolution.

In accordance with the above and further objects of the invention, an area meter includes a conveyor advantageously having top and bottom endless belts and a feed station for feeding objects to be measured between the top run of the bottom belt and the bottom run of the top belt, which top and bottom runs move in the same direction to carry the object thereinbetween.

The scanner includes a fluorescent lamp. The light from the fluorescent lamp is focused by a mirror system onto a photocell array having sensors spaced two millimeters apart center to center. The sensors are scanned by a clock system and generates a pulse for counting for each of the light sensors which is shaded from the fluorescent light. These pulses are counted and displayed in units representing the area of the object being scanned.

The conveyor system can be adjusted for different sized objects by: (1) changing the lens on the scanner to focus smaller objects across a wider area of the array; (2) adjusting the counter so that a different number of pulses are counted for each sensing unit that is shaded by the object from the fluorescent light; and (3) changing the decimal point of the LED display unit to provide a display of an appropriate number of significant digits. With this approach, a scanning array provides good resolution for smaller objects as well as good resolution for larger objects. The bite of the conveyor is adjustable.

It can be understood from the above description that the area meter of this invention has the advantages of: (1) being adjustable to measure different sized objects with good resolution; and (2) being relatively inexpensive. Some reasons that it is inexpensive are because it has an economical synchronizing system, an inexpensive system for starting the fluorescent lamps, standard camera lens and an inexpensive light source.

SUMMARY OF THE DRAWINGS

The above noted and other features of the invention will be better understood from the following detailed description when considered with reference to the accompanying drawings in which.

SPECIFIC DESCRIPTION

Figure 1:
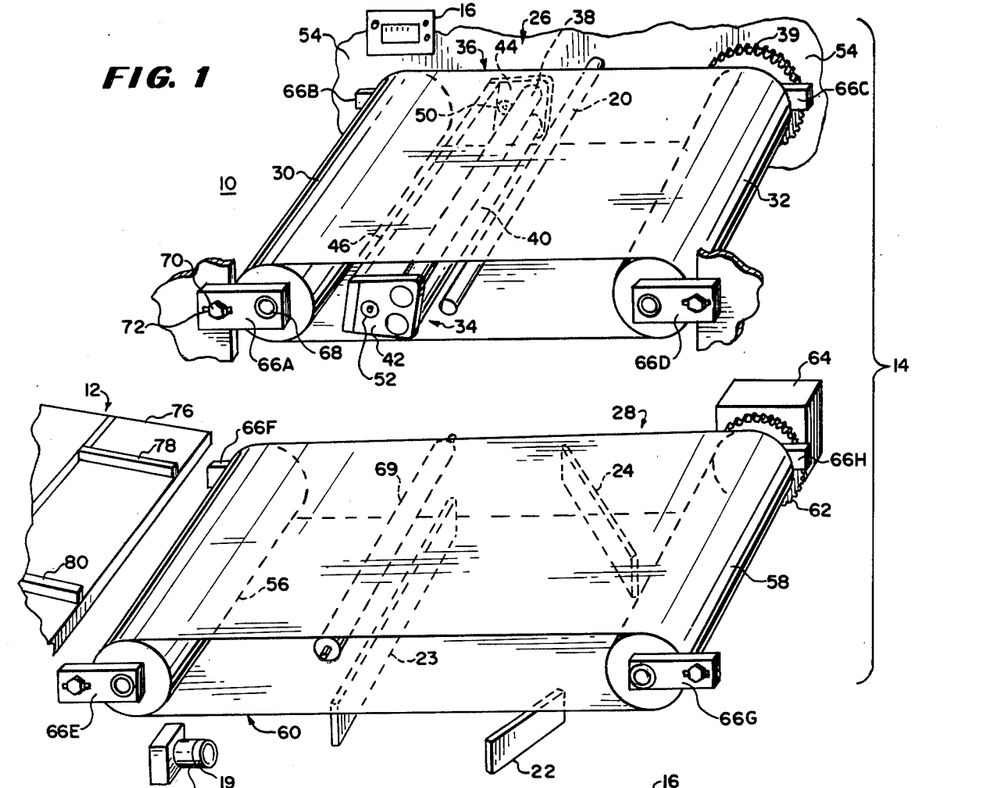
FIG. 1 is a simplified, exploded perspective view of an area meter in accordance with an embodiment of the invention.

In FIG. 1, there is shown, in a simplified, exploded, perspective view, an area meter 10 having a feed station 12, a transport section 14, an indicating display 16, and a measuring system to be described hereinafter. The measuring system includes a scanning sensor 18, a fluorescent lamp 20, first, second, and third mirrors 23, 24, and 22, and certain control circuitry (not shown in FIG. 1). The feed station 12, transport section 14, and measuring system are arranged so that the object to be measured, which may be a leaf or the like, is fed from the feed station 12 into the transport system 14 where it is carried past the measuring system for measurement. The area is displayed in the display unit 16. The display unit 16 is shown on the opposite side of the area meter 10 from its location in the prepared embodiment for illustration.

To move objects such as leaves or the like past a measuring station from the feed station 12, the transport system 14 includes a top conveyor section 26 and a bottom conveyor section 28, positioned to be in contact with each other, although the exploded view in FIG. 1 shows them separated.

The top conveyor section 26 includes a first roller 30, a second roller 32, an idler assembly 34, and an endless transParent conveyor belt 36. The roller 32 is a drive roller driven by a pinion 39 and the transparent belt 36 extends around both roller 30 and 32, with idler assembly 34 being positioned between the top run and the bottom run of the belt 36. The rollers are cylinders, positioned horizontally, and having a diameter of approximately two inches to accommodate the idler assembly 34 and a length of approximately 15 inches. The belt is approximately 12 inches in width.

The idler assembly 34 includes first and second idler rollers 38 and 40 rotatably mounted on their opposite ends to pivotable side plates 42 and 44 for rotation thereon. The idler rollers 38 and 40 extend in directions parallel to the rollers 30 and 32 and have their outer rims spaced from each other a distance greater than the diameter of the conveyor rollers 30 and 32 to permit curvature in the top run or the bottom run of the conveyor belt 36. The side plates 42 and 44 are mounted together by a flat support 46 at one end and form an assembly which pivots with respect to the outer frame at points 50 and 52. A portion of the outer frame is shown at 54 but the entire main portion of the framing members encasing the conveyor have been omitted from FIG. 1 to show the operating parts of the area meter.

The entire assembly 34 pivots about the points 50 and 52 when an object passing between conveyor sections 26 and 28 lifts the roller 40 so that the top run of the conveyor belt 36 is lifted along with its bottom run, thus shifting the normal curvature in the bottom run to an upper curvature in the top run and maintaining tension in the belt.

The bottom conveyor section 28 includes rollers 56 and 58 and a transparent belt 60 corresponding to the structure and cooperating with the rollers 30 and 32 and the transparent belt 36 of the top conveyor 26. The top run of the belt 60 is positioned in contact with the bottom run of the belt 36. The roller 58 is the drive roller and is driven from the same source as the roller 32. In one embodiment, the roller 56 is adjustable in position upwardly toward roller 30 to adjust the bite or a separate roller can be used for this purpose.

To drive rollers 32 and 58, a drive motor 64 has its output shaft connected to roller 58 and to spur gear 62 for rotation therewith. The gear 62 engages a pinion 39 so that the roller 32 of the top conveyor section 26 and the roller 58 of the bottom conveyor section 28 are both driven in synchronism with each other by the drive motor 64 to move an item along the transport path between the conveyor belts 36 and 60. Of course, the ratio between the two gears and the diameters of the rollers are selected so that the same linear speed is provided by the conveyor belts 60 and 36 and thus motion of one with respect to the other is avoided.

An idler roller 69 is mounted beneath the top run of the conveyor belt 60 opposite to the roller 40 so that the top run of the conveyor belt 60 and the bottom run of the conveyor belt 36 are pressed between the idler roller 69 and the idler roller 40, with the idler roller 40 being lifted by items passing therebetween against the weight of the assembly 34 and lifting the top run of conveyor belt 36 to avoid slack on the belt from release of weight of idler assembly 34.

Each of the rollers 30, 32, 56 and 58 is mounted at its opposite ends to the area meter cabinet 54 by a different one of eight journal plates 66A-66H, four of which 66A, 66B, 66E and 66F are adjustable. Each of the adjustable plates 66A, 66B, 66E and 66F is identical and only one, 66A, will be described herein.

The adjustable journal plate 66A is an aluminum parallelopiped having a cylindrical bearing bore 68 into which a shaft of a roller is journaled for rotation therein and a horizontal slot 72 adapted to receive a bolt 70 for mounting the plate 66A to the area meter cabinet 54. The slot 72 is sufficiently wide to receive the shank of the bolt 70 and sufficiently long so that the bolt 70 can rest in different locations within the plate 66A permitting adjustment of the position of the plate with respect to cabinet 54 into which the bolt extends. With this structure, each end of the rollers may be independently adjusted. In FIG. 1 each of the visible plates 66A, 66D, 66E and 66G is shown with the same structures, but of course only the plates 66A, 66B, 66E and 66F need be adjustable.

The independent adjustability of the ends of the rollers permits the belts to be loosened by moving both ends of a roller toward the other roller or permits angular adjustment of an individual roller. The angular adjustment of an individual roller changes the manner in which the belt tracks on that roller so that it may be kept centered.

The fluorescent lamp 20 of the measuring system is positioned between the upper and lower runs of the transparent belt 36 above the transparent belt 60 to shine light downwardly in the path of the object to be measured. The mirror 23 is positioned to receive the light which forms the image of the object between it and the lamp 20 and to reflect this light to the mirror 24. The mirror 24 is positioned to receive this light and to reflect it to mirror 22. The mirrors 22, 23 and 25 may be referred to as a first image forming means. The mirror 22 and sensor 18 are positioned so that the lens of the sensor 18 is focused upon the image of the object formed by mirror 22.

In the preferred embodiment, the sensor 18 is a solid-state line scanner including arrays of monolithic self-scanning linear photodiodes. The arrays consist of a row of silicon photodiodes, with an associated storage capacitance which integrates current and a multiplex switch for periodic readout by way of an integrating shift-register scanning circuit. Such devices are sold under the trade name RECTICON by Reticon Corporation, 910 Benicia Ave., Sunnyvale, Calif. Of course, other types of scanners may be used such as silicon tubes, CCD arrays and the like.

The drive motor 64, sensor 18 and fluorescent lamp 20 are interconnected so that, for each increment of distance that the conveyor belts 60 and 36 are moved by the drive motor 64, the lamp 20 pulses a sufficient number of times to provide good video signals. The image of the object being moved by the belts is focused on the sensor 18, which scans along the line of the image at fixed increments of motion of the object to determine the width of the object for that increment of motion. The width for each increment is added so as to provide a measure of the area of the object.

The frequency of line scans (number of complete scans each second) can be adjusted with respect to the number of pulses provided by the drive motor 64 as it turns the conveyor belts 36 and 60 to provide different resolutions. Moreover, the resolution may be changed by changing the size of the image of the object on the sensor. For example, objects may be scanned at a higher frequency with the same belt speed or the belt speed may be slowed to increase the resolution. Also, resolution may be increased for narrow objects (distance in a direction perpendicular to direction of motion) by enlarging the image of the object to make use of the full number of photodiodes in a line of the sensor 18. A constant correction may be necessary to provide conventional units of measurement as an output when changes are made.

In the preferred embodiment, two different scan frequencies are used for two different width classifications, which scan frequencies are: (1) one scan for each one mil of linear movement; and (2) three scans for each one mil of linear movement of the conveyor belts 36 and 60. One scan across the Reticon sensor in the preferred embodiment provides 256 elements on two mil centers. For simplicity in circuitry and improved accuracy, the single scan effect is obtained with scans which are averaged and used as one scan.

To display the area measurement, the display 16 provides a readout of a number corresponding to the integral of the incremental area measurements by the sensor 18. The decimal point is adjustable electronically to compensate for the smaller or larger objects to accommodate different resolutions of measurement.

To feed objects to the transport system for measurement, the feed station 12 includes a platform 76. The platform 76 includes two guides 78 and 80 which are parallel to each other and extend in the direction of the transport path. The guides accommodate between them, the object which is to be measured, as it is fed into the bite from between the guides. One plate is provided in the preferred embodiment having guides 25.4 centimeters (10 inches) apart. The display 16 provides two digits after the decimal point. In another embodiment, a plate having guides 7.62 centimeters (3 inches) apart is substituted to measure smaller objects and the display 16 is adjusted to read 3 digits after the decimal point.

Before operating the area meter, several adjustments are made, such as adjustments in: (1) the location of the rollers 56 and 30; (2) the decimal point of the display 16; (3) the effective scan rate; (4) the lens of the sensor 18; and (5) the distance apart of the guides 78 and 80.

To adjust the rollers 56 and 30, the bolt 70 which extends through the slot 72 is loosened and the rollers moved until the belts 36 and 60 are tight. The conveyor may be run at this time to see if the belts creep to one side or the other. If they do, the bolt on one side of the adjustable roller having the creep is loosened and the roller moved at an angle and the bolt re-tightened until the belt does not creep.

If small items are to be measured, a guide plate having guides 7.62 centimeters (3 inches) apart is inserted in the feed station 12 and if larger items are to be measured, a guide plate having guides 25.4 centimeters (10 inches) apart is inserted in the guide station. The lens 19 for the sensor 18 is a replaceable means and is selected so the image is focused across a large portion of the sensor. This also requires in the preferred embodiment a minor change in the position of the sensor 18, as well as a lens change to obtain proper focusing.

Since the magnification of the image of the object and the scan rate are different for small objects from the magnification and the scan rate for large objects being measured, the display 16 must also be adjusted so that in the preferred embodiment, there are three significant decimal places to the right of the decimal point for small objects where scanning is across a 7.62 centimeter distance and two where scanning is across a 25.4 centimeter distance on the conveyor because of the change in resolution.

In operation, the object to be measured is carried by the transport section 14 past the measuring system, where its image is scanned and its area read out on the display 16.

To carry an object through the transport section 14, the object is fed between the guides 78 and 80 of the feed station 12 into the bite of the belts 60 and 36. Small items are fed on a support plate having the guides 78 and 80, 7.62 centimeters apart and large items are fed onto a support plate having the guides 78 and 80, 25.4 centimeters apart. The two different sizes of support plates are substitutable onto the feed station 12. The support plates may be referred to as replaceable guide means.

The roller 30 is driven in a counter-clockwise direction (FIG. 1) and the roller 56 is driven in a clockwise direction so that the conveyor belts 60 and 36 grasp the item in the in the bite and move it securely along between the belts without slippage. As the item is carried past the fluorescent lamp 20, its image is projected onto the sensor 18 where it is scanned. After being measured, it leaves the belts beyond the rollers 58 and 32. The roller 32 drives the conveyor belt 36 and the roller 58 drives the conveyor belt 60. Rotational force is applied to these rollers by the synchronous drive motor 64 which drives the spur gear 62 through a motor output gear in a clockwise direction. The spur gear 62 meshes with the pinion 39 to drive the roller 32 in a counter-clockwise direction.

If the object is large, it lifts the idler pulley 40 as it passes between the idler pulley 40 and the idler roller 69, with the idler assembly 34 pivoting about the pivot points 50 and 52. As the idler assembly 34 is moved upwardly, the idler roller 38 lifts the top run of the conveyor belt 36 so that both the top run and the bottom run move upwardly to maintain proper tension and permit the object to pass between the belts. The idler assembly 34 also exerts force downwardly to hold the belts 36 and 60 together.

To form an image of the object as it passes the fluorescent lamp 20, light from the lamp is blocked by the object to form an image indicated by a pattern of light impinging on mirror 23, which is located beneath the transport section 14. The fluorescent lamp receives a square wave AC potential which causes it to be illuminated practically continuously to provide a good video signal. This light is reflected to the mirror 24 which reflects it to the mirror 22, which reflects it to the scanner 18. The lens of the scanner 18 is selected to project a 7.62 centimeter image directly across the sensing element for small items or a 25.4 centimeter line across the scanning element for large objects. The lens 19 of the scanner 18 may be referred to as a second image forming means.

To scan the image focused by the lens of the sensor 18 onto the sensing array, the entire array of sensing elements is scanned at a rate four times the line frequency (generally 240 scans per second). The 1 millimeter spots in a line which are darkened are counted by the display 16 and the light spots are not, resulting in the counting of a matrix corresponding to the area of the object and the display of this area on the display 16. The scan rate, the rate of pulses applied to the fluorescent lamp 20 and the belt drive are all maintained in synchronism with the alternating current potential applied to the drive motor 64. In the preferred embodiment the belt is driven at 80 millimeters per second although this rate can be altered, particularly if it is desirable to read out the area in dimensions other than centimeters on the display 16.

Figure 2:
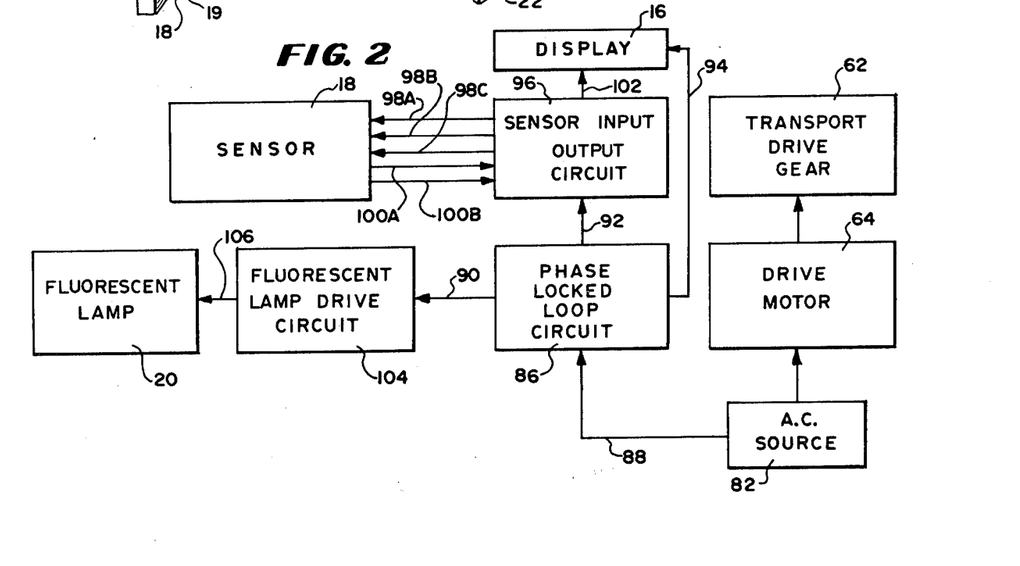
FIG. 2 is a block diagram of the area meter in FIG. 1.

In FIG. 2, there is shown a block diagram of the system which maintains the fluorescent lamp 20, the sensor 18, and the transport drive gear 62 in synchronism. This system includes an AC source 82, the drive motor 64 and a phase locked loop 86, with the AC source being at the same frequency as the mains supply (60 hertz in the United States and 50 hertz in certain other countries) and being electrically connected to the drive motor 64 and to the phase locked loop 86.

The drive motor is a synchronous motor and is mechanically connected to the transport drive gear 62 to drive the transport section 14 (FIG. 1) at a speed synchronous with the output of the AC source 82.

To keep the sensor 18 and fluorescent lamp 20 in synchronism with the transport drive gear 62, the phase locked loop 86: (1) is electrically connected to the output of the AC source 82 by a conductor 88 through which it receives, as a basic timing standard, the same frequency electrical power as that which drives the drive motor 64; (2) generates 480 hertz (eight times mains frequency) electrical power and applies it to an output conductor 90; and (3) generates 240 hertz power (four times mains frequency) and applies it to an output conductor 92. The phase locked loop also generates 960 hertz power (sixteen times mains frequency) and applies it to an output conductor 94 to provide a multiplex frequency to the display 16.

The phase locked loop 86 serves as a means for generating basic timing pulses having a repetition rate proportional to the frequency of the alternating current from the AC source 82 and thus forms an integral part of a sensing means that generates pulses representing the width of an object and a pulse means forming pulses at the rate at which the object is moved.

To control the sensor 18 and the display 16: (1) a sensor input-output circuit 96 is electrically connected to conductor 92 through which it receives the 240 hertz pulses and includes circuitry to read at a synchronous rate from the sensor 18 information concerning the area of objects as they pass through the transport section 14 (FIG. 4); and (2) the display 16 is electrically connected to the phase locked loop 86 through conductor 94 to receive 960 hertz multiplex signals.

The sensor input-output circuit 96 includes circuitry that: (1) applies signals to the sensor 18 through conductors 98A–98C to read information from the sensor; (2) processes signals received from the sensor 18 through conductors 100A and 100B; and (3) applies the processed signal to the display 16 through a conductor 102.

To enable the fluorescent lamp 20 to be illuminated and extinguished at a rate that provides a good video signal for measuring area, a fluorescent lamp drive circuit 104 is electrically connected to the output of the conductor 90 from which it receives 480 hertz pulses. The fluorescent lamp drive circuit 104 generates a high voltage pulse for application to the fluorescent lamp 20 through a conductor 106 to start the fluorescent lamp, and thereafter, maintains the rate at which the lamp is illuminated in synchronism with the 480 hertz pulses applied to the fluorescent lamp drive circuit 104 through conductor 90.

Figures 3, 4:
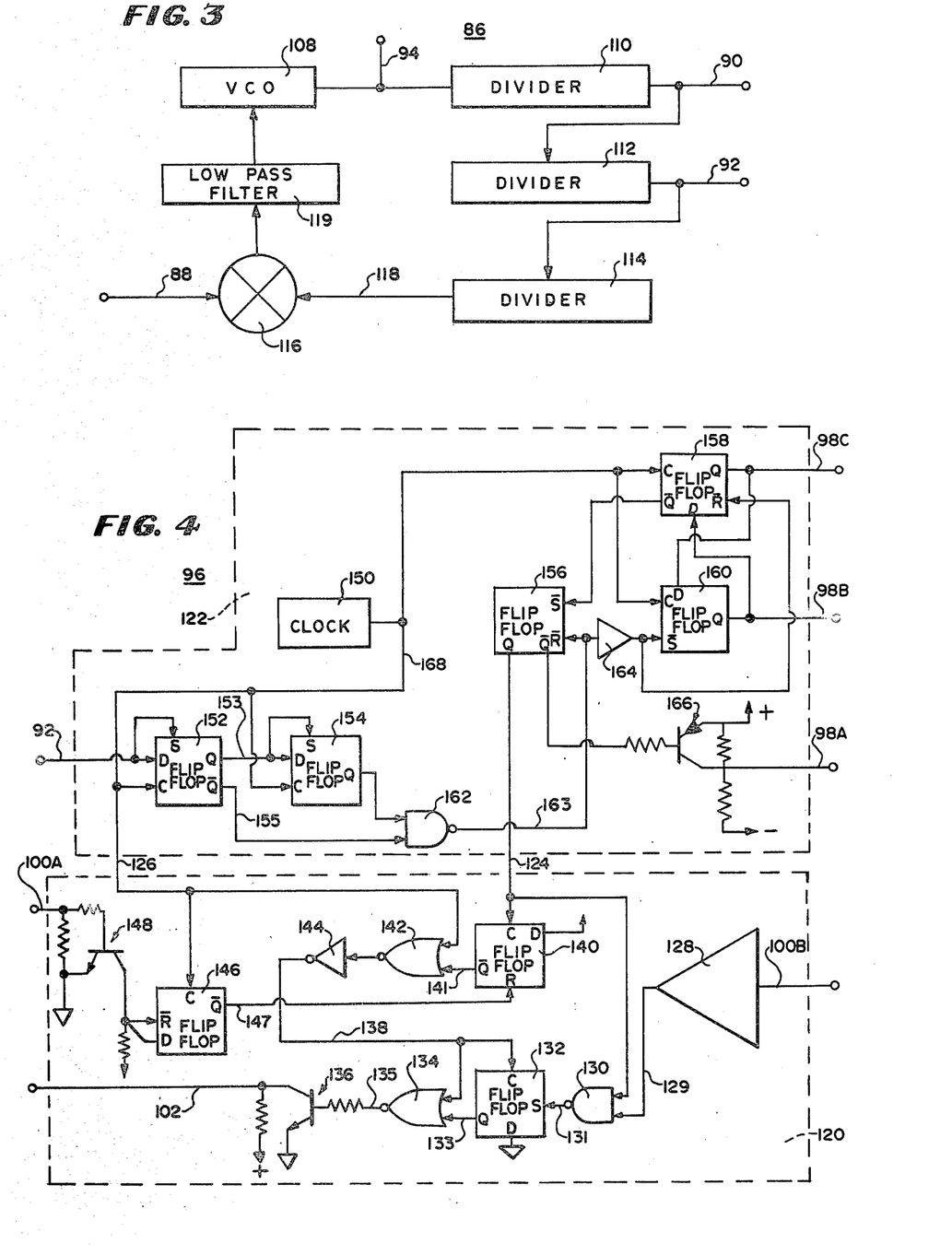
FIG. 3 is a block diagram of a portion of the area meter of FIG. 1.
FIG. 4 is a block diagram of another portion of the area meter of FIG. 1.

In FIG. 3, there is shown a block diagram of the phase locked loop circuit 86 having VCO 108, first, second and third dividers 110, 112 and 114 respectively, a comparator 116 and a low pass filter 119. The VCO 108 has its output conductor electrically connected to conductor 94 to provide 960 hertz pulses thereto and to divider 110 which divides these pulses by two and provides 480 hertz pulses to the conductor 90. Divider 112 has input connected to conductor 90 to receive 480 hertz pulses, which it divides by two, and thus applies 240 hertz pulses to output conductor 92 and to the input of the divider 114. Divider 114 divides these pulses by four and applies 60 hertz pulses to one input of the comparator 116 through a conductor 118.

To maintain synchronism with the 60 hertz mains power, the other input of comparator 116 is connected to the output of conductor 88 from which it receives a 60 hertz signal from the AC source 82. The output of the comparator 116 is applied to the input of the low pass filter 119 which converts it to a DC potential having an amplitude related to the frequency difference between the signals on conductors 118 and 88 and applies it to the input of the VCO 108. The components of the phase locked loop 86 are selected so that when the comparator 116 is receiving the same frequency on conductors 88 and 118, the VCO 108 applies 960 hertz pulses (16 times the mains frequency) to the conductor 94.

While FIG. 3 shows one type of phase locked loop with dividers to provide frequencies which are desirable in this circuit, other designs of phase locked loops are available for use in a similar manner.

In FIG. 4, there is shown a simplified logic diagram of the sensor input-output circuit 96 having a sensor output timing circuit 120 and a sensor input timing circuit 122. The sensor output timing circuit 120 receives video signals from the sensor 18 on conductor 100B and end-of-readout signals on conductor 100A and applies the video information to the display 16 on conductor 102; the sensor input timing circuit 122 receives clock pulses on conductor 92 from the phase locked loop 86 (FIGS. 2 and 3) and provides a start readout signal on conductor 98A, a first phase readout signal on conductor 98B and a second phase readout signal on conductor 98C to the sensor 18. The sensor input timing circuit 122 and sensor output timing circuit 120 are electrically connected by conductors 124 and 126.

To read information from the scanning sensor 18 to the display 16, the sensor output timing circuit 120 includes an amplifier stage 128, a NAND gate 130, a flip-flop 132, a NOR gate 134, and an NPN transistor 136 connected in series in the order named. The input to the amplifier 128 is connected to conductor 100B to receive the output from the scanning sensor 18.

The NAND gate 130, the flip-flop 132 and the NOR gate 134 are connected in series to synchronize the read-out and convert blocked photocell signals to binary ones at the output of NOR gate 134 and binary zero (ground level) at conductor 102.

The synchronization of the signals is necessary because, in the preferred embodiment, the photocells of the sensor integrate the signal representing the light passing the object and then are read out rapidly in synchronism with signals of alternate phase. Accordingly, the video signals from the scanning sensor are read out over a short period of time between start and stop pulses.

The converting of the blocked photocell signals to binary zero pulses at 102 is necessary because the photocells blocked by the object provide a steady binary zero output that shows no separation between photocells whereas it is desirable to count binary zero pulses (ground level) at output of the scanner at 100B and ground level at 102) for those photocells, one pulse for each blocked photocell.

The video signals may also vary in width, principally because of edge effects of the objects being measured. However, it is desirable to provide constant width pulses to the display counter or other devices through conductor 102.

To develop constant width pulses from the video signals which may vary in width, NAND gate 130 has one of its two inputs electrically connected to the output of the amplifier 128 through conductor 129 and its other input electrically connected to conductor 124. With this connection, the NAND gate 130 receives a low (binary zero) signals before the beginning of each readout of the sensor 18 from conductor 124 on one of its two inputs. This puts the flip-flop 132 in an initial condition such that its Q output is high. The NAND gate 130 receives video signals on the other of its inputs from the output of the video amplifier 128 during the readout of the sensor so that binary zero pulses from the output of the video amplifier 128 during the readout result in a binary one being applied to the set terminal of the flip-flop 132. This signal carries binary zero pulses which correspond to elements that were not blocked from light and thus accumulated charge.

To synchronize the video signals, the clock terminal of the flip-flop 132 is electrically connected to conductor 138 which carries gated clock pulses. These gated clock pulses reset the flip-flop 132 so that it provides a binary zero on its Q output terminal since its data input is a binary zero. A binary zero output pulse from video amplifier 128, which corresponds to an element of sensor 18 (FIG. 2) that was exposed to light sets flip-flop 132 so as to change its Q output to a binary one.

One of the inputs of the NOR gate 134 is connected to the Q output of the flip-flop 132 through conductor 133 and the other is connected to conductor 138 so that pulses are applied to the output of the NOR gate 134 if the flip-flop 132 has not been set by the video signal corresponding to an element of the sensor that was exposed to light. If the flip-flop 132 has been set thus causing the Q output to go high, there will be no pulse on the output of NOR gate 134. Before the beginning of the readout of the sensor, flip-flop 132 is set by a binary zero pulse on conductor 124 from flip-flop 156 and the resulting set pulse from NAND gate 130. This initially prevents clock pulses from passing through gate 134. Since the output of the NOR gate 134 is connected to the base of the NPN transistor 136 through conductor 135, the collector of the NPN transistor 136, which is in a grounded emitter configuration, provides binary zero pulses for each element of the scanning sensor that has not been exposed to light since flip-flop 132 has not been set.

To provide gated clock pulses and an end-of-scan signal, the sensor output timing circuit 120 includes a flip-flop 140, a NOR gate 142, an inverter 144, a second flip-flop 146, and an NPN transistor 148.

The flip-flop 140 has its clock input terminal electrically connected to the conductor 124 and its reset input terminal electrically connected to the Q bar output (sometimes referred to as not Q or $\overline{Q}$) of the flip-flop 146 through conductor 147. Its Q bar output is electrically connected to conductor 141 and to one of two inputs of the NOR gate 142, the other input being connected to conductor 126 and the output of NOR gate 142 being connected to conductor 138 through the inverter 144.

The data and non-reset inputs (activated by binary low, expressed sometimes as reset bar) of the flip-flop 146 are electrically connected to the collector of the NPN transistor 148, the base of which is electrically connected to conductor 100A, and the clock input of the flip-flop 146 is connected to conductor 126. The emitter of the NPN transistor 148 is connected to ground.

With these connections, a low signal is applied from the Q bar output of the flip-flop 140 to one input of NOR gate 142 through conductor 141 at the beginning of each readout because of the end of the binary zero pulse applied to the clock input of flip-flop 140 by conductor 124; and clock pulses from conductor 126 are applied to the other of the two inputs of the NOR gate 142. The pulses applied to NOR gate 142 result in gated clock pulses being applied to the flip-flop 132 and to one input of the NOR gate 134 through inverter 144.

At the end of a readout from the scanning sensor 18, an end-of-readout pulse is applied to conductor 100A and drives the transistor 148 into conduction. Transistor 148 applies a negative going potential to the reset bar input of the flip-flop 146 which is then reset and thus resets the flip-flop 140. When flip-flop 140 is reset the clock pulses are terminated by a positive signal from the flip-flop 140 to one input of the NOR gate 142.

Although one amplifier 128 is shown in FIG. 4, for purposes of illustration, more than one amplifier may be used. For example, in the preferred embodiment, the scanning sensor is a Reticon scanner which requries an operational amplifier connected as a current-to-voltage amplifier, and a voltage comparator. The video signal is compared to a voltage signal level that can be adjusted by a potentiometer in this circuit to make a fine adjustment to set threshold of the comparator between binary one (negative) and a binary zero (near ground at 100B) and thus compensate for certain types of noise and variations such as variations in intensity of light from the light source, nonlinearity of the sensor and the like.

To provide timing signals to the scanning sensor 18 and clock pulses to the sensor output timing circuit on conductor 126, the sensor input timing circuit 122 includes a clock pulse generator 150, 5 flip-flops, 152, 154, 156, 158 and 160, a NAND gate 162, a buffer 164, and a transistor 166.

To provide the basic timing signals, the clock pulse generator 150 generates 200 kilohertz clock pulses and applies them through conductor 168 to the clock terminal of flip-flop 152, the clock terminal of flip-flop 154, conductor 126, the clock terminal of flip-flop 158, and the clock terminal of flip-flop 160. Conductor 92 applies 240 hertz pulses to the data-in and to the set terminals of flip-flop 152, with flip-flop 152 having its Q output electrically connected to the data in and to the set terminals of flip-flop 154 and its Q bar output terminal connected through conductor 155 to one of the two inputs of NAND gate 162, the other input being connected to the Q output terminal of flip-flop 154.

With these connections, the NAND gate 162 applies negative pulses to reset the flip-flop 156, to set the flip-flop 160, and to reset the flip-flop 158. These pulses occur at a rate of 240 hertz but are synchronized by flip-flops 152 and 154 to coincide with the positive transitions of the continuously running clock 150. Flip-flop 158 applies set pulses to flip-flop 156 and data pulses to flip-flop 160, the flip-flop 160 applying data pulses to flip-flop 158. The Q outputs of flip-flop 158 and flip-flop 160 are applied to terminals 98C and 98B respectively to provide two phase signals at 100 kilohertz. The Q bar output of flip-flop 156 is connected to the base of the PNP transistor 166 to apply a negative pulse to output conductor 98A during the start of a scan. The Q output of flip-flop 156 provides a negative pulse on conductor 124 which occurs before the readout of the sensor occurs.

Figure 5:
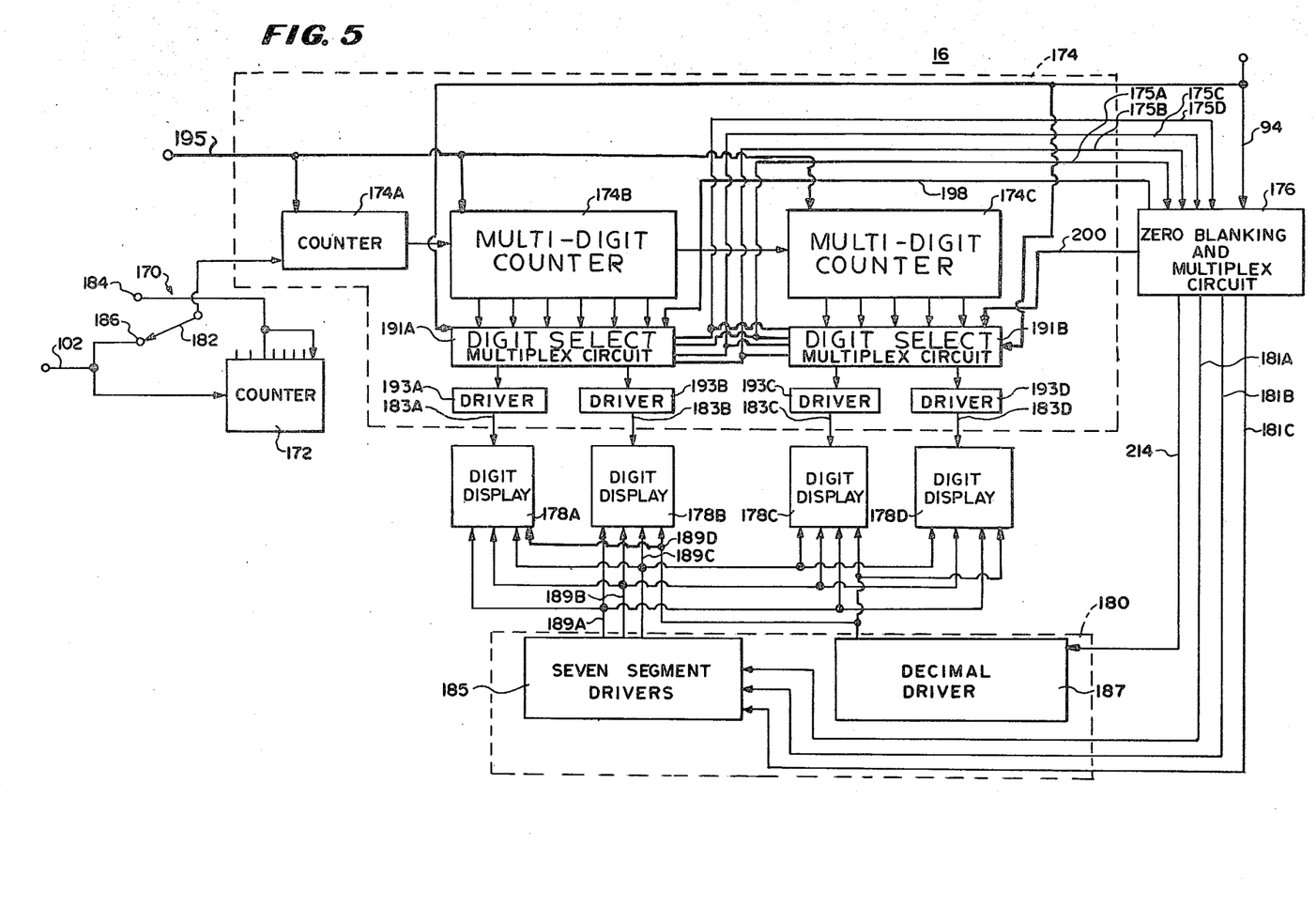
FIG. 5 is a block diagram of still another portion of the area meter of FIG. 1.

In FIG. 5, there is shown a block diagram of the display 16 including an input switch 170, an object-size adjustment counter 172, a readout counter section 174, a zero blanking and multiplex circuit 176, a plurality of digit displays 178A-178D and a segment driver section 180.

The readout counter section 174 receives pulses from the scanning sensor 18 on conductor 102 through the input switch 170. It has a sufficient number of bits to provide a plurality of one digit indications of area and has its outputs connected to: (1) the zero blanking and multiplex circuit 176 through conductors 175A-175D which carry BCD signals to indicate the value in each digit position; and (2) to the digit displays 178 through conductors 183A-183D to select the digit for display during multiplexing. The driver section 180 is connected to the zero blanking and multiplex circuit 176 through conductors 214 and 181A-181C and to the segments of the digit displays 178A-178D and energizes selected ones of the segments in synchronism with signals from the readout counter section 174 to energize the selected segments at the time the selected digit display 178 is energized.

To adjust the decimal point of the digit display to accommodate items between the 7.62 centimeter guides or the 25.4 centimeter guides as shown on FIG. 1, the size-adjustment switch 170 includes a movable switch arm 182, a first stationary contact 184, and a secondary stationary contact 186.

Conductor 102 is electrically connected to stationary contact 186 and to the count input terminal of the size-adjustment counter 172, which is a three position counter. The third output of the counter is electrically connected to stationary contact 184 and to the reset terminal of the counter 172 so that the counter 172 recirculates every third count. The switch arm 182 is electrically connected to the count input of the first stage of the counter 174 so that, with the switch arm 182 in contact with stationary contact 186, each of the pulses from conductor 102 is counted by the counter 174 and with the switch arm 182 closed in stationary contact 184, every third count of the counter 172 is counted by the counter 174.

To adjust the readout counter 174 to the proper digit, the three counter sections 174A, 174B and 174C of the readout counter 174 are connected in series in the order named with section 174A receiving the count from switch 170 and section 174C being the last section. The number of stages in section 174A which are counted for each pulse applied to section 174B is selected to provide the desired scaling factor to section 174B to indicate a digit representing the dimension of the object being measured.

In the preferred embodiment, since the readout is in millimeters and the counts are also in millimeters when the switch 170 is properly adjusted, the counter 174A is not necessary and can be left out of the circuit so that the counts are applied directly to section 174B. However, for other dimensions, section 174B has its input connected to a selected tap of section 174A to accommodate different dimensions. For different units such as inches, the speed of the belt must also be changed to adjust the number of counts for the area being measured in the direction of motion as well as the change made in counter section 174A for the dimension perpendicular to the direction of motion.

The zero blanking and multiplex circuit 176 is electrically connected to conductor 94 to receive 960 hertz pulses from the phase locked loop 86 (FIGS. 2 and 3) for synchronizing and to sections 191A and 191B through conductors 198 and 200, respectively to multiplex the illumination of numbers in the display device by energizing alternate sections 191A and 191B of the digit select multiplex circuit.

To energize selected numerals to the digit displays 178A-178D, the zero blanking and multiplex circuit 176 is connected to the driver section 180, which includes the seven segment drivers 185, through conductors 181A-181C. The seven segment drivers 185 are electrically connected to each of the segments in the digit displays 178A-178D through conductors 189A-189C. The decimal driver 187 of the driver section 180 is electrically connected to conductor 214 to receive signals from the zero blanking and multiplex circuit 176 indicating the particular decimal to be illuminated.

Each of the seven segments represents a certain value in each digit display and is connected through a different one of the conductors 189A-189C to a seven segment driver and to the segments representing the same value in the other digit displays so that a signal is applied to each digit display indicating the numeral represented by that value. The decimal driver 187 is connected to the decimal point segments of all digit displays through conductors to apply signals indicating the selected decimal point location.

To select the digit display to show the numeral and decimal point selected by the driver section 180, the readout counter section 174 includes the digit select multiplex circuits 191A and 191B and the drivers 193A-193D which sequentially energize the digit display 178A-178D at the same time the selected values are transmitted to the zero blanking and multiplex circuit in BCD code over conductors 175A-175D.

Since the drivers are energized in sequence starting with the most significant bit position, the digit displays 178A-178D receive digits in sequence from the counter sections 174B and 174C so as to start with the most significant bit position and move to the least significant digits as the sequence progresses. The drivers 193A-193D energize the common conductor of the digit displays in response to energization by the digit select multiplex circuits 191A and 191B.

To reset the counters 174A-174C after a measurement, a manual reset switch (not shown) which connects a reset pulse to conductor 195 is provided. In the alternative, a pulse generator which generates reset pulses for every complete revolution of the conveyor belts can be used. Conductor 195 is connected to the reset terminal of counters 174A-174C.

To blank zeros, the output conductors 175A-175D are connected to the zero blanking and multiplex circuit 176. The zero blanking and multiplex circuit 176 detects a zero numeral indication being provided to a digit display and applies a signal to the driver corresponding to that display to prevent the energization of the display.

While four drivers and digit displays are shown in FIG. 5 it is understood more may be used, and in the preferred embodiment, eight are used. Moreover, the correct number of conductors is not shown in this description but a sample number, such as three, conveniently used in places for illustration only.

The decimal point in the display may be changed to provide more significant numbers when the different sizes are changed. This change is made in the zero blanking multiplex circuit 176 and merely requires the shifting of a switch 202 (not shown in FIG. 5) within the zero blanking and multiplex circuit 176 which changes the timing of a pulse on conductor 214 to the decimal driver 187.

Figure 6:
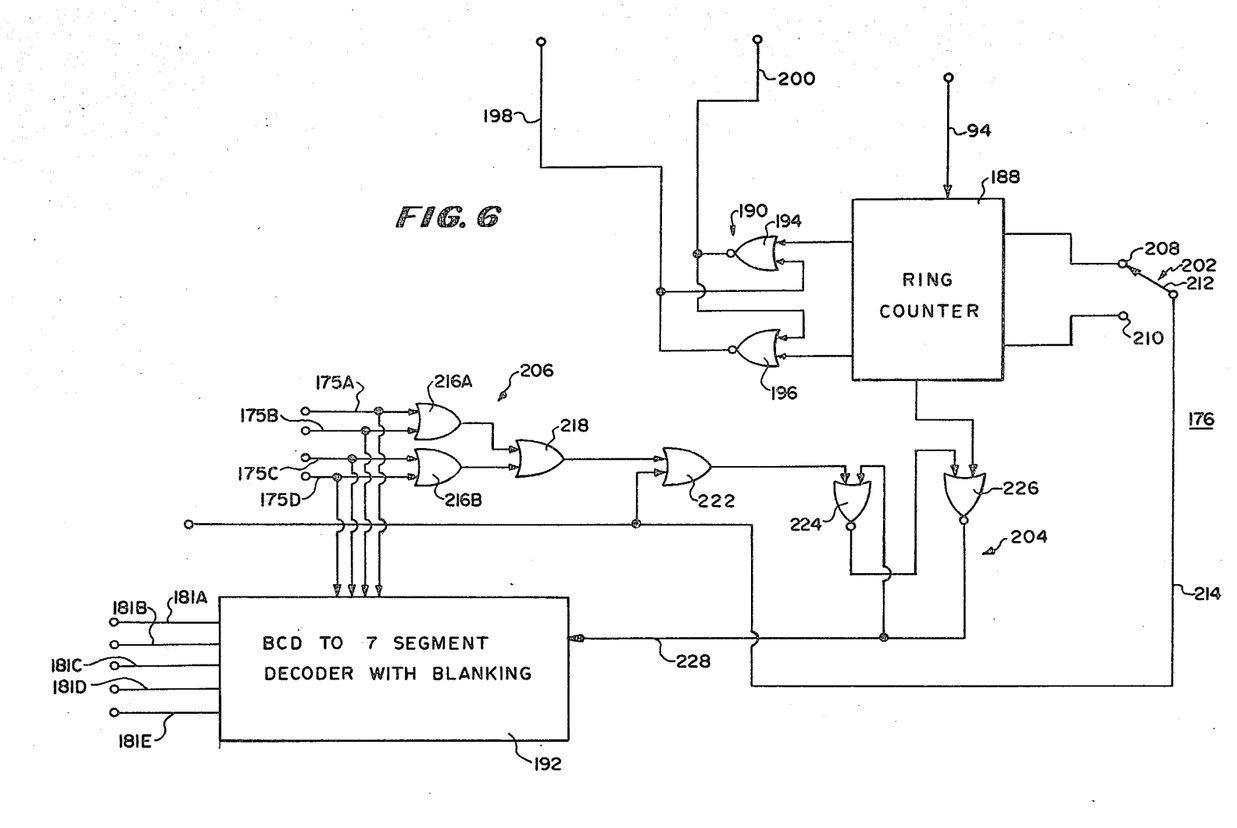
FIG. 6 is a logic diagram of still another portion of the area meter of FIG. 1.

In FIG. 6, there is shown a logic circuit diagram of the zero blanking and multiplex circuit 176 having a ring counter 188, a multiplex logic circuit 190, BCD to 7 segment decoder with blanking circuit 192, a NOR gate logic circuit 204 and an OR gate logic circuit 206.

The multiplex logic circuit 190 includes two NOR gates 194 and 196 each having one input connected to a different output terminal of the counter 188 and the other input connected to an output of the other of the two NOR gates so as to form a flip-flop. During counting operations, the flip-flop is switched from stage to stage to provide alternate phase pulses on counter-select output conductors 198 and 200, each of which is connected to a different one of the digit select multiplexers 191A and 191B to provide multiplexing of the two counters.

The zero blanking circuit includes a single-pole, double-throw switch 202, a NOR gate logic circuit 204 and an OR gate logic circuit 206.

To adjust for different size items or to change the decimal point, the switch 202 includes a first stationary contact 208, a second stationary contact 210, and a movable switch arm 212, with each of the stationary contacts 208 and 210 being connected to different outputs of the counter 188 and the movable switch arm 212 being electrically connected to a conductor 214. With this arrangement, the conductor 214 may be connected to either of the two outputs, one of which is for smaller size measurements and the other for larger sizes. To adjust to different units the output conductors of the ring counter 188 to which switch contacts 208 and 210 are connected are changed. Thus, this circuit provides a counting means for dividing the pulses applied to counter 188 by a selected number to adjust for different size items being measured.

The means for dividing includes a means for dividing substantially in accordance with the square of the factor by which the dimension of the image focused on the sensing means is changed in a direction perpendicular to the direction of motion of the measuring means and object with respect to each other. For example, as described above in the preferred embodiment the lens may be changed to focus between a width along the conveyor of 25.4 centimeters (10 inches) or between a width of 7.62 centimeters (3 inches). Thus the factor by which the dimension of the image focused on the sensing means is changed in a direction perpendicular to the direction of motion of the conveyor is three. The square of three is nine and so the dividing means, which is described above as the ring counter 188, divides by nine in the usual manner, providing one output for every nine counts around the ring counter in a conventional manner for dividing with ring counters.

To blank zeros, the OR gate circuit 206 includes four OR gates 216A, 216B, 218 and 222. OR gates 216A and 216B have their inputs connected to BCD outputs of counter sections 174B and 174C through conductors 175A-175D, which designate the numeral read into the counters to recognize a zero count in those sections. Conductors 175A-175D are also connected to the BCD to seven segment decoder with blanking 192 for decoding of the BCD to a seven segment code with the conductor for each segment being energized at its proper count for application to conductors 181A-181E. The outputs of OR gates 216A and 216B are each connected to a different one of the two inputs of the OR gate 218, the output of which is connected to one of the two inputs of OR gate 222. The other input of OR gate 222 is connected to conductor 214 to recognize a digit to the left of the decimal point.

The NOR gate circuit 204 includes first and second NOR gates 224 and 226 connected together as a flip-flop with the output of each being connected to one of the two inputs of the other. The other input of the NOR gate 226 is connected to an output of counter 188 and the other input of the NOR gate 224 is electrically connected to the output of OR gate 222, so that, during the multiplexing operation, the recognition of a non-zero digit or the digit to the left of the decimal point in either of the sections 174B or 174C causes the flip-flop to be set to apply a pulse to output conductor 228 of the NOR gate 226, thus causing the BCD to seven segment decoder with blanking 192 to discontinue to blank its outputs at that digit and subsequent less significant digits.

The BCD to seven segment decoder with blanking 192 converts the BCD code received on conductors 175A-175D to a signal on one of the conductors 181A-181E corresponding to the numeral indicated by the BCD code from the counters 174B and 174C. This indication is applied to the seven segment drivers 185 (FIG. 5) together with the decimal drive signal on conductor 214 in synchronism with the signals applied to the selected digit display 178A-178D (FIG. 5) from the drivers 183A-183D. A blanking signal on conductor 228 blocks the signals to the segments.

Figure 7:
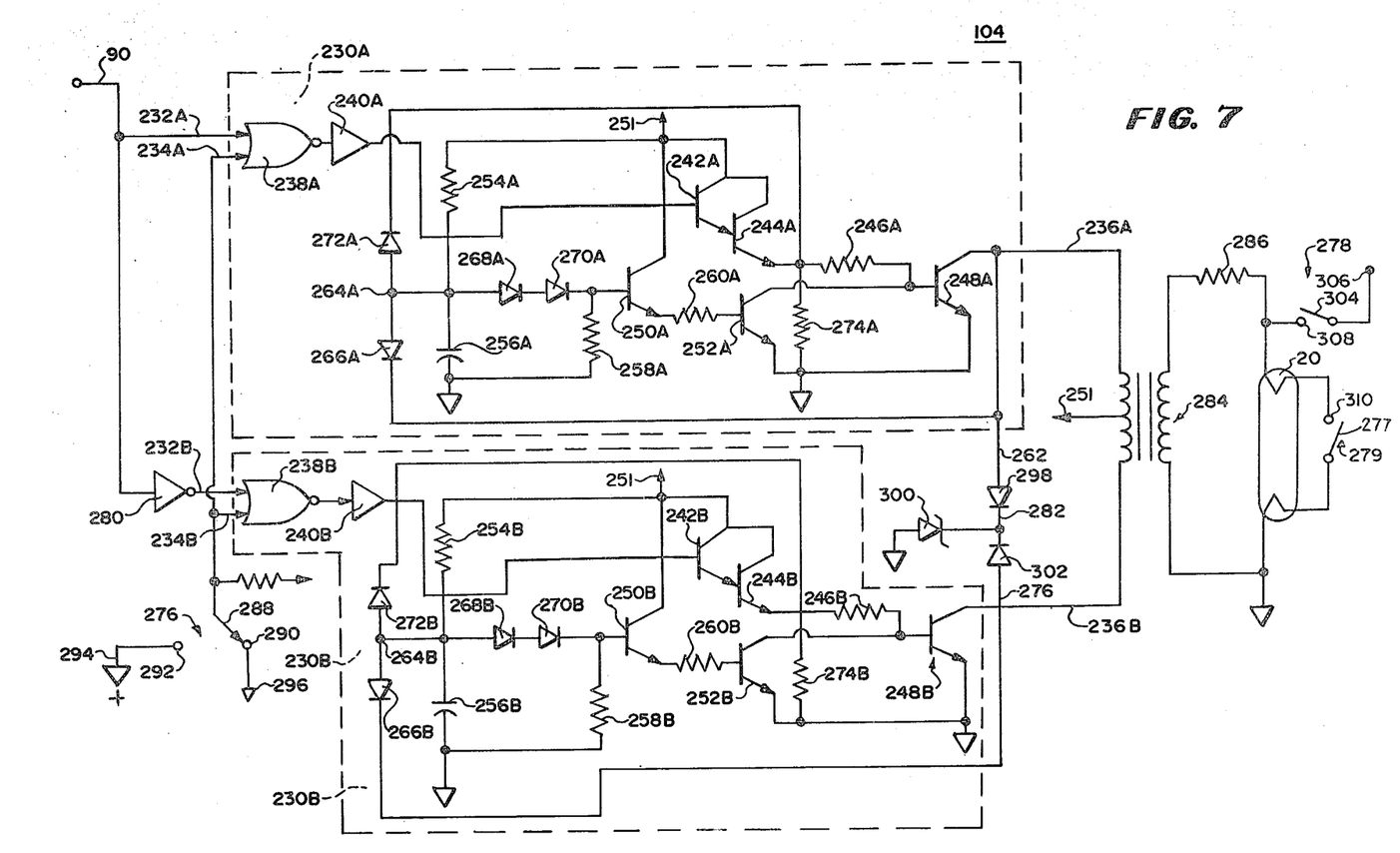
FIG. 7 is a schematic circuit diagram of a portion of the area meter of FIG. 1.

In FIG. 7, there is shown a schematic circuit diagram of the fluorescent lamp drive circuit 104 and the fluorescent lamp 20.

To apply alternating potentials to the fluorescent lamp 20, the fluorescent lamp drive circuit 104 includes first and second half-wave drivers 230A and 230B, which are identical in construction. Half-wave driver 230A is electrically connected to input conductors 232A and 234A and output conductor 236A; half-wave driver 230B similarly is connected to input conductors 232B and 234B and output conductor 236B. The half-wave driver 230A will be described in detail but not the half-wave driver 230B since its parts are identical and are numbered with reference numerals differing only by the suffix from those used in the explanation of driver 230A.

The half-wave driver 230A includes a NOR gate 238A, an amplifier 240A, a Darlington amplifier (NPN transistor 242A and NPN transistor 244A), a resistor 246A, and an NPN transistor 248A connected in series in the order named. The NOR gate 238A has one of its two inputs electrically connected to conductor 232A and its other input electrically connected to conductor 234A. The collector of output transistor 248A is electrically connected to: (1) conductor 236A so that two binary zero inputs to the NOR gate 238A result in a half-wave output on conductor 236A; and (2) an overvoltage short circuit 282 through a conductor 262 to protect against high voltage transients.

The transistor 248A is protected by a transistor circuit including NPN transistor 250A and 252A. In this circuit, the input of the amplifier 240A is directly connected to the output of the NOR gate 238A and the output of the amplifier 240A is connected to the base of the transistor 242A the collector of which is connected to: (1) the collector of transistor 250A; (2) the source of positive potential 251; and (3) ground through the series connected resistor 254A and capacitor 256A.

Between ground and the capacitor 256A, another resistor 258A has one end connected to ground and its other end connected to the base of the transistor 250A. The collectors of the transistors 242A and 244A forming the Darlington amplifier are electrically connected to the collector of the transistor 250A and transistor 244A has its emitter connected through the resistor 246A to the base of transistor 248A.

To protect against excessive dissipation due to unsaturated operation of transistor 248A, transistor 252A has its collector electrically connected to the base of the transistor 248A, its emitter electrically connected to ground and to the emitter of the transistor 248A and its base electrically connected to the emitter of transistor 250A through a resistor 260A. A point 264A in the circuit is electrically connected to: (1) conductor 262 through the forward resistance of a diode 266A; (2) to the base of transistor 250A through the forward resistances of diodes 268A and 270A; (3) to the emitter of transistor 244A through the forward resistance of a diode 272A; and (4) to ground through the forward resistance of the diode 272A and a resistor 274A.

In a similar manner, the half-wave driver 230B has: (1) one input of the NOR gate 238B electrically connected to conductor 232B; (2) its other input electrically connected to conductor 234B; and (3) the collector of a transistor 248B is electrically connected to output conductor 236B and to a circuit 282 through a conductor 276.

To start and run the fluorescent lamp 20, the fluorescent lamp drive circuit 104 includes first, second and third switches 276, 278 and 279, an inverter 280, the over voltage circuit 282, a transformer 284 and a resistor 286.

The inverter 280 has its output electrically connected to conductor 232B and its input electrically connected to conductor 90 (FIGS. 3 and 7) and conductor 232A so that positive pulses on conductor 90 are applied directly to NOR gate 238A, are inverted by inverter 280 and applied as a negative pulse to NOR gate 238B. Similarly, negative pulses applied to conductor 90 are applied directly to NOR gate 238A and inverted before being applied to NOR gate 238B. With this arrangement, the NOR gate 238A and the NOR gate 238B are alternately energized to provide alternating pulses to the fluorescent lamp 20.

The switch 276 is a single-pole, double-throw switch having a movable switch arm 288, a first stationary contact 290, and a second stationary contact 292, with the second stationary contact 292 being electrically connected to a source of positive potential 294 and the first stationary contact 290 being electrically grounded at 296.

With these connections, the switch arm 288 is in contact with stationary contact 290 when the circuit is in the run position. In this position a ground level pulse is applied to one input of both the NOR gate 238A and the NOR gate 238B so that, when a negative or ground level pulse (binary zero) is applied to the other input of either of these gates, a positive output (binary one) is provided by the NOR gate 238B and when a positive input is provided to either NOR gate 238A or NOR gate 238B that gate provides a negative output.

When the switch arm 288 is against the second stationary contact 292, the circuit is off and a negative pulse is applied by the output of NOR gate 238B and 238A. Accordingly, with the switch in the run position, the drivers 230A and 230B alternately provides output pulses to conductors 236A and 236B and when off neither provides output pulses.

The primary winding of transformer 284 has one end electrically connected to conductor 236A, the other end connected to conductor 236B and its center tap connected to the positive source of 16 volts so as to transmit alternating pulses to its secondary winding. The circuit 282 includes a first diode 298 having its anode electrically connected to conductor 262 and its cathode connected to ground through the reverse resistance of the zener diode 300 and a second diode 302 having its anode electrically connected to conductor 276 and its cathode electrically connected to ground through the reverse resistance of the zener diode 300.

The secondary winding of the transformer 284 has one end electrically connected to one of the electrodes of the fluorescent lamp 20 through the resistor 286 and its other end electrically connected to ground and to the other electrode of the fluorescent lamp 20. With these connections, when the lamp is in running condition, alternating current pulses are applied across the lamp 20 which causes it to emit flickering light at the frequency of the pulses applied to it.

The switch 278 is a single-pole, single-throw switch having its movable switch arm 304 electrically connected to a source of positive potential 306 and having a stationary contact 308 electrically connected to the resistor 286 and to the first electrode of the fluorescent lamp 20. The switch 279 is also a single-pole, single-throw switch having its switch arm 277 electrically connected to one of the electrodes of the fluorescent lamp 20 and a stationary contact 310 electrically connected to the other electrodes.

With these connections, the fluorescent lamp may be started by closing movable switch arm 288 against contact 292 to prevent NOR gates 238A and 238B from applying pulses to the inverters 240A and 240B, thus preventing alternating current from being applied to the secondary of the transformer.

With the switches 278 and 279 closed, which is the start position for the fluorescent lamp 20, current flows from the source 306 through the switch arm 304, the contact 308, the first electrode of the lamp 20, the fixed contact 310, the switch arm 277, through the second electrode of the fluorescent lamp 20, and to ground to heat those electrodes before pulses are applied. Current also flows through the resistor 286 and the secondary winding of transformer 284 to ground to store energy in the inductive field of the secondary winding.

When the switches 278 and 279 are switched open and switch 276 switched to the run position, alternating current pulses are applied to the primary of the transformer and the secondary is discharged through the fluorescent lamp 20, thus providing a high start potential followed by alternating pulses. In this manner, the secondary of the transformer 284 acts as a ballast.

From the above description, it can be understood that the area meter 10 has several advantages, such as: (1) it is inexpensive to build; (2) it is adjustable to measure different area objects while retaining good resolution with each size; (3) it is adjustable to align the belts of the conveyor in such a manner as to reduce the travel from one side to the other; and (4) it may handle thick or thin objects without difficulty.

It is economical to build because synchronism is obtained by the use of a phase locked loop operated from the same source that drives the synchronous motor of the belt system rather than by relatively expensive mechanical systems. The phase locked loop generates pulses in synchronism with the belt and these pulses are used to control the rate of scanning by the Reticon scanner tube and to cause the fluorescent lamp to flicker at a rate sufficiently high to preserve good video.

It has the advantage of being adjustable to different sizes with relative ease because the scan rates can be adjusted by changing the lens and making a minor adjustment in the counter. By changing the decimal point of the readout, a sufficient number of significant digits is maintained in the readout.

Each end of the rollers of the belts can be adjusted to align the belt so there is no travel from one side to the other. A pivotable idler which moves both top and bottom runs of the top conveyor belt upwardly to permit large objects to pass underneath it prevents the belts from being distorted by such large objects and from slipping on the rollers.

Although a preferred embodiment has been described with some particularity, many modifications and variations in the embodiment are possible without deviating from the invention. It is, therefore, to be understood that within the scope of the appended claims, the invention may be practiced other than as specifically described.

What is claimed is:

1. Apparatus for measuring the area of objects comprising:
    measuring means for generating a plurality of pulses related to the area of an object to be measured;
    conveyor means for moving the object to be measured and the measuring means with respect to each other;
    said conveyor means including first and second replaceable guide means for guiding objects of at least first and second widths into a predetermined path into said conveyor means and means for mounting said guide means;
    said measuring means including sensing means for generating a plurality of dimension pulses proportional to at least one dimension of said object to be measured and focusing means for focusing an image of at least a portion of said object to be measured onto the sensing means;
    said focusing means including first image forming means for projecting said image in a predetermined direction, and second image forming means for receiving said image from said first image forming means and projecting it onto said sensing means;
    one of said first and second image forming means including at least one of first and second replaceable focusing means for focusing different sizes of said portion of said object across a predetermined length of said sensing means, whereby the image is properly focused across a large portion of said sensor; and
    said first and second replaceable focusing means cooperating with said first and second guide means to focus said image onto said sensing means.

2. Apparatus according to claim 1 in which the first and second replaceable focusing means each includes a different one of a plurality of lens.

3. Apparatus according to claim 2 in which the first image forming means includes first and second mirrors, and said sensing means is positioned so that the focusing means is focused upon the image of the object formed by one of said first and second mirrors.

4. Apparatus according to claim 3 in which the sensing means includes an array of photodiodes and the focusing means focuses the image on said photodiodes.

5. Apparatus according to claim 4 in which said replaceable guide means includes a platform and first and second guides, whereby the object may be placed on said platform between said guides.

6. Apparatus according to claim 5 in which said measuring means includes means for adjusting said count by at least one of first and second factors corresponding to said first and second replaceable focusing means.

7. Apparatus according to claim 2 in which the sensing means includes an array of photodiodes and the focusing means focuses the image on said photodiodes.

8. Apparatus according to claim 2 in which said replaceable guide means includes a platform and first and second guides, whereby the object may be placed on said platform between said guides.

9. Apparatus according to claim 2 in which said measuring means includes means for adjusting said count by at least one of first and second factors corresponding to said one of said first and second replaceable means.

10. Apparatus according to claim 1 in which said measuring means includes means for adjusting said count by at least one of first and second factors corresponding to said first and second replaceable focusing means.

11. A method of measuring the area of an object comprising the steps of:
    moving said object along a conveyor;
    radiating said object with light;
    forming an image of said object with said light;
    positioning a focusing means to focus on said image;
    selecting said focusing means to focus said image on a sensor across substantially a predetermined area, whereby a different focusing means is utilized for different ranges of areas of objects;
    generating a signal proportional to at least one dimension of said image on said sensor;
    adjusting said signal to compensate for the change of said focusing means;
    said step of selecting a focusing means including the steps of selecting one of a plurality of lens and positioning the lens and the sensing means so as to focus different size images across a substantial portion of the active area of said sensing means.

12. A method according to claim 11 in which said step of forming an image comprises the step of positioning a mirror to form an image of said object and focusing said lens on said image.

13. A method according to claim 12 in which the step of generating a signal includes the step of generating series of pulses proportional in number to said dimension.

14. A method according to claim 13 in which the step of adjusting includes the step of dividing said pulses.

* * * * *